(12) United States Patent
Yasuda et al.

(10) Patent No.: US 11,058,996 B2
(45) Date of Patent: Jul. 13, 2021

(54) POROUS HOLLOW FIBER MEMBRANE

(71) Applicant: TORAY INDUSTRIES, INC., Tokyo (JP)

(72) Inventors: Takaaki Yasuda, Shiga (JP); Masayuki Hanakawa, Shiga (JP); Kenta Iwai, Shiga (JP); Toshiyuki Ishizaki, Shiga (JP)

(73) Assignee: TORAY INDUSTRIES, INC., Tokyo (JP)

(*) Notice: Subject to any disclaimer, the term of this patent is extended or adjusted under 35 U.S.C. 154(b) by 246 days.

(21) Appl. No.: 16/079,837

(22) PCT Filed: Feb. 24, 2017

(86) PCT No.: PCT/JP2017/007117
§ 371 (c)(1),
(2) Date: Aug. 24, 2018

(87) PCT Pub. No.: WO2017/146211
PCT Pub. Date: Aug. 31, 2017

(65) Prior Publication Data
US 2019/0070565 A1    Mar. 7, 2019

(30) Foreign Application Priority Data

Feb. 25, 2016    (JP) .............................. JP2016-034668

(51) Int. Cl.
*B01D 69/08*    (2006.01)
*B01D 67/00*    (2006.01)
(Continued)

(52) U.S. Cl.
CPC ......... *B01D 69/085* (2013.01); *B01D 61/142* (2013.01); *B01D 67/0016* (2013.01);
(Continued)

(58) Field of Classification Search
CPC .. B01D 69/085; B01D 69/08; B01D 67/0016; B01D 71/34; B01D 67/0027;
(Continued)

(56) References Cited

U.S. PATENT DOCUMENTS 4,399,035 A    8/1983    Nohmi et al.
5,022,990 A    6/1991    Doi et al.
(Continued)

FOREIGN PATENT DOCUMENTS

JP    1-22003 B2    4/1989
JP    2899903 B2    6/1999
(Continued)

OTHER PUBLICATIONS

International Search Report, issued in PCT/JP2017/007117, PCT/ISA/210, dated Apr. 18, 2017.
(Continued)

*Primary Examiner* — Waqaas Ali
(74) *Attorney, Agent, or Firm* — Birch, Stewart, Kolasch & Birch, LLP (57) ABSTRACT

An object of the present invention is to provide a porous hollow-fiber membrane satisfying both high strength and high pure-water permeation performance and at the same time, having high bending resistance. The present invention relates to a porous hollow-fiber membrane including a fluororesin-based polymer, in which the porous hollow-fiber membrane has a columnar texture oriented in a longitudinal direction of the porous hollow-fiber membrane and when a photograph of a cross-section parallel to the longitudinal direction of the porous hollow-fiber membrane is binarized into a structure portion and a void portion, the following 1) and 2) are satisfied: 1) a proportion of an area of the void portion is from 20 to 50%, and 2) a value obtained by
(Continued)

dividing a total of peripheral lengths of the void portions by a total of areas of the void portions is 2.0 $\mu m^{-1}$ or less.

18 Claims, 2 Drawing Sheets

(51) Int. Cl.
  *B01D 71/34* (2006.01)
  *B01D 71/32* (2006.01)
  *B01D 69/02* (2006.01)
  *B01D 61/14* (2006.01)

(52) U.S. Cl.
  CPC ..... *B01D 67/0027* (2013.01); *B01D 67/0093* (2013.01); *B01D 69/02* (2013.01); *B01D 69/08* (2013.01); *B01D 69/087* (2013.01); *B01D 71/32* (2013.01); *B01D 71/34* (2013.01); *B01D 2323/08* (2013.01); *B01D 2323/10* (2013.01); *B01D 2325/02* (2013.01); *B01D 2325/022* (2013.01); *B01D 2325/24* (2013.01)

(58) Field of Classification Search
  CPC ............. B01D 61/142; B01D 67/0093; B01D 69/087; B01D 69/02; B01D 71/32; B01D 2323/10; B01D 2325/02; B01D 2323/08; B01D 2325/022; B01D 2325/24
  See application file for complete search history.

(56) References Cited

U.S. PATENT DOCUMENTS

| | | |
|---|---|---|
| 2003/0094409 A1 | 5/2003 | Minegishi et al. |
| 2005/0258101 A1 | 11/2005 | Minegishi et al. |
| 2006/0178480 A1 | 8/2006 | Tada et al. |
| 2007/0090051 A1 | 4/2007 | Minegishi et al. |
| 2017/0348649 A1 | 12/2017 | Hanakawa et al. |

FOREIGN PATENT DOCUMENTS

| | | | |
|---|---|---|---|
| JP | 2003-210954 A | | 7/2003 |
| JP | 2003-320228 A | | 11/2003 |
| JP | 2006-297383 A | | 11/2006 |
| JP | 2006297383 A | * | 11/2006 |
| JP | 4885539 B2 | | 2/2012 |
| WO | WO 03/031038 A1 | | 4/2003 |
| WO | WO 2004/081109 A1 | | 9/2004 |
| WO | WO 2016/104743 A1 | | 6/2016 |

OTHER PUBLICATIONS

Written Opinion of the International Searching Authority, issued in PCT/JP2017/007117, PCT/ISA/237, dated Apr. 18, 2017.

Office Action dated Dec. 8, 2020, in Japanese Patent Application No. 2017-512848.

* cited by examiner

POROUS HOLLOW FIBER MEMBRANE

TECHNICAL FIELD

The present invention relates to a porous hollow-fiber membrane suitable for various water treatments such as drinking water production, industrial water production, water purification treatment, wastewater treatment and seawater desalination.

BACKGROUND ART

In recent years, a porous membrane is utilized in a variety of areas, for example, a water treatment field such as water purification treatment and wastewater treatment, a medical application such as blood purification, a food industry field, a battery separator, a charged membrane, and an electrolyte membrane for fuel cells.

Among others, in the drinking water production field and industrial water production field, i.e., the water treatment field such as water purification treatment usage, wastewater treatment usage and seawater desalination usage, a porous membrane is used as an alternative to conventional sand filtration, coagulating sedimentation and evaporation or for enhancing the quality of treated water.

As the porous membrane for water treatment, a membrane appropriate to the size of a separation target substance contained in water to be treated is used. Usually, natural water contains many suspended components and therefore, a microfiltration or ultrafiltration membrane for removal of suspended components in water is used in general.

In the water treatment, for the purpose of sterilizing permeate or preventing biofouling of separation membrane, a sterilizer such as sodium hypochlorite may be added to the portion of separation membrane module, or as chemical cleaning of separation membrane, the separation membrane may be washed with an acid such as hydrochloric acid, citric acid and oxalic acid, an alkali such as aqueous sodium hydroxide solution, chlorine, a surfactant, etc. Accordingly, a separation membrane using, as a material having high chemical resistance, a fluororesin-based polymer typified by polyvinylidene fluoride has been recently developed and utilized.

In the water purification treatment field, a problem of a chlorine-resistant pathogenic microorganism such as cryptosporidium getting mixed in with drinking water has been manifested since late 20th century, and strength high enough to prevent membrane breakage even in case of an abrupt application of load and allow for no mixing of raw water is required for the porous hollow-fiber membrane.

Furthermore, in these fields, since the amount of treated water is large, a porous membrane with excellent water permeation performance makes it possible to reduce the membrane area, provide a compact apparatus and in turn, save the equipment cost and is advantageous in view of membrane exchange cost or footprint.

In general, the water permeation performance may be enhanced by increasing the porosity, thereby expanding the water passage. However, when the porosity is increased, the membrane structure portion decreases and in turn, strength-elongation of the porous membrane is reduced.

That is, water permeation performance and strength-elongation of the porous membrane are usually in a trade-off relationship. Accordingly, in order to obtain a highly chemical-resistant porous hollow-fiber membrane having high water permeation performance and high strength-elongation by breaking the trade-off, various methods have been heretofore proposed.

For example, Patent Document 1 discloses a wet solution method using a fluororesin-based polymer. Specifically, in Patent Document 1, a polymer solution prepared by dissolving a fluororesin-based polymer in a good solvent is extruded through a spinneret at a fairly lower temperature than the melting point of the fluororesin-based polymer to put the polymer solution into contact with a liquid containing a non-solvent for the fluororesin-based polymer so as to form an asymmetric porous structure by way of non-solvent induced phase separation.

Patent Document 2 discloses a melt-extraction method, and specifically, the following method is described. First, a fluororesin-based polymer is melt-kneaded with an inorganic fine particle and an organic liquid to obtain a membrane-forming raw liquid. This membrane-forming raw liquid is extruded through a spinneret at a temperature not less than the melting point of the fluororesin-based polymer and cooled/solidified. Thereafter, a porous structure is formed by extracting the organic liquid and the inorganic fine particle. In case of melt-extraction method, the void characteristics are easy to control, and a membrane having a relatively homogeneous three-dimensional network structure is obtained without forming macrovoids.

Patent Document 3 also discloses a melt-extraction method. In Patent Document 3, two kinds of fluororesin-based polymers differing in the weight average molecular weight are used and after adding a plasticizer and a good solvent thereto, the resulting mixture is melt-extruded into a hollow-fiber membrane shape, cooled/solidified, subjected to extraction of the plasticizer, and further drawn to obtain a porous hollow-fiber membrane in which a mixture of a crystal oriented portion and a crystal non-oriented portion is recognized.

Patent Document 4 discloses a method in which a fluororesin-based polymer solution containing a fluororesin-based polymer and a poor solvent therefor and having a temperature not less than the phase separation temperature is ejected into a cooling bath at a temperature not more than the phase separation temperature and solidified to obtain a hollow-fiber membrane.

Furthermore, in Patent Document 5, a fibrous texture having a diameter of 0.9 μm to 3 μm and being oriented in the longitudinal direction of a porous hollow-fiber membrane including a fluororesin-based polymer accounts for 30% or more of the entire porous hollow-fiber membrane, whereby a porous hollow-fiber membrane excellent in strength and pure-water permeation performance is obtained.

BACKGROUND ART DOCUMENT

Patent Document

Patent Document 1: JP-B-1-22003
Patent Document 2: Japanese Patent No. 2899903
Patent Document 3: Japanese Patent No. 4885539
Patent Document 4: WO 2003/031038
Patent Document 5: JP-A-2006-297383

SUMMARY OF THE INVENTION

Problems that the Invention is to Solve

However, in the wet solution method of Patent Document 1, it is difficult to cause phase separation uniformly in the membrane thickness direction, and since a membrane having an asymmetric three-dimensional network structure containing macrovoids is formed, the strength is disadvantageously insufficient. Furthermore, there is a drawback that many membrane-forming conditions and factors affect the membrane structure or membrane performance and therefore, not only the membrane-forming process is difficult to control but also the reproducibility is poor.

The strength of the porous membrane obtained by the melt-extraction method of Patent Document 2 is not sufficient, and if the inorganic fine particle exhibits poor dispersibility, a defect such as pinhole is possibly produced. In addition, the melt-extraction method has a drawback that the production cost becomes extremely high.

It is difficult for the porous hollow-fiber membrane of Patent Document 3 to realize high strength while maintaining practical pure-water permeation performance. The porous hollow-fiber membranes obtained in Patent Documents 4 and 5 are insufficient in terms of strength in the short-side direction, i.e., bending resistance, though the strength in the longitudinal direction is enhanced.

Taking into account the problems of the conventional techniques above, an object of the present invention is to provide a porous hollow-fiber membrane exhibiting high strength while maintaining high pure-water permeation performance by using a fluororesin-based polymer having high chemical resistance.

Means for Solving the Problems

As a result of many intensive studies to solve the problems above, the present inventors have found that in regard to a porous hollow-fiber membrane including a fluororesin-based polymer, the trade-off between water permeation performance and strength-elongation in the porous membrane can be broken by forming a columnar texture having an excellent thickness uniformity and being oriented in a longitudinal direction of the porous hollow-fiber membrane and furthermore, the bending resistance in the short-side direction can be drastically enhanced by decreasing cracks at a site where columnar structures are coupled with each other. The present invention has been accomplished based on this finding. That is, the present invention provides the following technique.

[1] A porous hollow-fiber membrane including a fluororesin-based polymer, in which the porous hollow-fiber membrane has a columnar texture oriented in a longitudinal direction of the porous hollow-fiber membrane, and when a photograph of a cross-section parallel to the longitudinal direction of the porous hollow-fiber membrane is binarized into a structure portion and a void portion, the following 1) and 2) are satisfied:

1) a proportion of an area of the void portion is from 20 to 50%, and 2) a value obtained by dividing a total of peripheral lengths of the void portions by a total of areas of the void portions is 2.0 $\mu m^{-1}$ or less.

[2] The porous hollow-fiber membrane according to [1], in which the columnar texture accounts for 60% or more of the porous hollow-fiber membrane.

[3] The porous hollow-fiber membrane according to [1] or [2], in which the columnar texture has a short-side length of from 0.5 µm to 3.0 µm.

[4] The porous hollow-fiber membrane according to any one of [1] to [3], in which a coefficient of variation obtained by dividing a standard deviation of the short-side length of the columnar texture by an average value of the short-side length of the columnar texture is 0.2 or less.

[5] The porous hollow-fiber membrane according to any one of [1] to [4], in which an aspect ratio of the columnar texture is from 3 to 50.

[6] The porous hollow-fiber membrane according to any one of [1] to [5], having a breaking strength at 25° C. of 25 MPa or more.

[7] The porous hollow-fiber membrane according to any one of [1] to [6], in which when a photograph of a cross-section parallel to the longitudinal direction of the porous hollow-fiber membrane is binarized into the structure portion and the void portion, the value obtained by dividing the total of the peripheral lengths of the void portions by the total of the areas of the void portions is 1.2 $\mu m^{-1}$ or more.

Advantage of the Invention

According to the present invention, a porous hollow-fiber membrane having excellent chemical durability owing to a fluororesin-based polymer with high chemical resistance and at the same time, having both excellent physical durability and high pure-water permeation performance is provided.

MODE FOR CARRYING OUT THE INVENTION

1. Porous Hollow-Fiber Membrane (1-1) Fluororesin-Based Polymer

The porous hollow-fiber membrane of the present invention includes a fluororesin-based polymer. The fluororesin-based polymer as used in the present description means a resin containing a vinylidene fluoride homopolymer and/or a vinylidene fluoride copolymer. The fluororesin-based polymer may contain a plurality of kinds of vinylidene fluoride copolymers.

The vinylidene fluoride copolymer is a polymer having a vinylidene fluoride residue structure and is typically a copolymer of a vinylidene fluoride monomer with another fluorine-based monomer, etc.

Such a copolymer includes, for example, a copolymer of vinylidene fluoride with one or more kinds of monomers selected from vinyl fluoride, tetrafluoroethylene, hexafluoropropylene and trifluorochloroethylene.

In addition, a monomer other than the above-described fluorine-based monomer, for example, ethylene, may be copolymerized to an extent not impairing the effects of the present invention.

The weight average molecular weight of the fluororesin-based polymer may be appropriately selected according to the strength and water permeation performance required for the polymer separation membrane. In the fluororesin-based polymer, as the weight average molecular weight is larger, the water permeation performance is reduced, and as the weight average molecular weight is smaller, the strength is reduced. For this reason, the weight average molecular weight of the fluororesin-based polymer is preferably from 50,000 to 1,000,000. In case of a water treatment application where the polymer separation membrane is subject to chemical cleaning, the weight average molecular weight of the fluororesin-based polymer is preferably from 100,000 to 700,000, more preferably from 150,000 to 600,000.

The porous hollow-fiber membrane preferably includes the fluororesin-based polymer as a main component, and the "porous hollow-fiber membrane includes the fluororesin-based polymer as a main component" indicates that the proportion of the fluororesin-based polymer in the porous hollow-fiber membrane is 50 wt % or more.

The proportion of the fluororesin-based polymer in the porous hollow-fiber membrane is preferably 80 wt % or more, more preferably 90 wt % or more, still more preferably 95 wt % or more. The porous hollow-fiber membrane may be composed of only the fluororesin-based polymer.

(1-2) Columnar Texture

The porous hollow-fiber membrane has a columnar texture oriented in the longitudinal direction of the porous hollow-fiber membrane. The "columnar texture" is a solid material having an aspect ratio (longitudinal length/short-side length) of 3 to 50. The "longitudinal length" as used herein indicates the length in the longitudinal direction of the columnar texture.

The longitudinal length can be measured by observing the to-be-measured columnar texture at a magnification large enough to confirm its longitudinal length by a scanning electron microscope (SEM). At this time, the observation is performed in a rectangular visual field with the one-side length being from 10 to 50 times the short-side length of the columnar texture. In one-time observation, the longitudinal length is measured on 5 or more, preferably 10 or more, columnar textures. Such observation and measurement are performed three or more times, preferably five or more times, and an average value of the obtained longitudinal length values is determined and can be used as a representative longitudinal length value of the columnar texture.

The "short-side length" is an average length in the short-side direction of the columnar texture. This average length is determined by measuring the length in each short-side direction at arbitrary 20 points or more, preferably 30 points or more, in one columnar texture and calculating an average value thereof.

The columnar texture preferably includes the fluororesin-based polymer as a main component, and the "includes the fluororesin-based polymer as a main component" indicates that the proportion of the fluororesin-based polymer in the columnar texture is 50 wt % or more.

The proportion of the fluororesin-based polymer in the columnar texture is preferably 80 wt % or more, more preferably 90 wt % or more, still more preferably 95 wt % or more. The columnar texture may be composed of only the fluororesin-based polymer.

The "oriented in the longitudinal direction" as used herein means that out of angles between the longitudinal direction of the columnar texture and the longitudinal direction of the porous hollow-fiber membrane, the acute angle is within 20°.

In the porous hollow-fiber membrane of the present invention, in order to satisfy both high pure-water permeation performance and high strength-elongation performance, the short-side length of the columnar texture is preferably from 0.5 µm to 3.0 µm, more preferably from 1.0 µm to 2.5 µm. If the short-side length is less than 0.5 µm, physical strength of the columnar texture itself decreases and consequently, the strength-elongation performance is reduced. On the contrary, if the short-side length exceeds 3.0 µm, the void between columnar textures becomes small, and therefore, the pure-water permeation performance is reduced.

Furthermore, in the porous hollow-fiber membrane of the present invention, in order to satisfy both high bending resistance performance and high strength-elongation performance, the value obtained by dividing the standard deviation of the short-side length of the columnar texture by the average value of the short-side length, i.e., the coefficient of variation of the short-side length, is preferably 0.2 or less, more preferably 0.15 or less.

When the coefficient of variation of the short-side length is 0.2 or less, this means that the length variation in each short-side direction of the columnar texture is small and the thickness uniformity of the columnar texture is high, that is, a constricted portion of the structure, which is a crack working out to an origin of the fracture, is less formed, and consequently, high bending resistance performance and high strength-elongation performance are obtained.

When the porous hollow-fiber membrane keeps high strength-elongation, this is advantageous in that deformation or fiber breakage is less likely to occur even upon an abrupt application of load. The breaking strength at 25° C. and elongation at break of the porous hollow-fiber membrane are respectively, preferably 25 MPa and 50% or more, more preferably 30 MPa and 70% or more.

The porous hollow-fiber membrane of the present invention may contain a texture other than the columnar texture, to the extent not deviating from the object of the present invention. The structure other than the columnar texture includes, for example, a spherical texture having an aspect ratio (longitudinal length/short-side length) of less than 3. In the case of including a spherical texture, when a spherical texture having a short-side length and a longitudinal length each in the range of 0.5 µm to 3 µm is used, reduction in the strength-elongation is suppressed, and good pure-water permeation performance is maintained.

However, if the proportion of such a spherical texture in the porous hollow-fiber membrane becomes large, it is likely that spherical textures are increasingly coupled with each other and the constricted portion is increased, leading to a reduction of the bending resistance performance and strength-elongation performance. For this reason, in the porous hollow-fiber membrane, the proportion of the columnar texture imparting bending resistance performance and strength-elongation performance to the porous hollow-fiber membrane is preferably larger and is preferably 60% or more, more preferably 70% or more, still more preferably 80% or more.

Here, the occupancy (%) of the columnar texture is determined according to the following formula (1) after taking a photograph of a cross-section in the longitudinal direction of the porous hollow-fiber membrane by SEM, etc. at a magnification enabling clear identification of a columnar texture and a spherical texture, preferably at a magnification of 1,000 to 5,000 times, in a rectangular visual field with one-side length being from 10 to 50 times the shot-side length of the columnar texture.

However, the structure portion is a portion including a resin in the cross-section. In order to increase the accuracy, it is preferable to determine the occupancy for cross-sections at arbitrary 5 points or more, preferably 10 points or more, and calculate an average value thereof.

Occupancy of columnar texture (%)={(area occupied by columnar texture)/(area occupied by structure portion)}×100  (1)

Here, the area occupied by the structure portion and the area occupied by the columnar texture can be determined preferably by employing a method of converting the area into a corresponding weight of each portion photographed. More specifically, after the photograph taken is printed on paper, the weight of paper corresponding to the structure portion and the weight of paper corresponding to the columnar texture portion cut out therefrom may be measured.

Figure 1A:
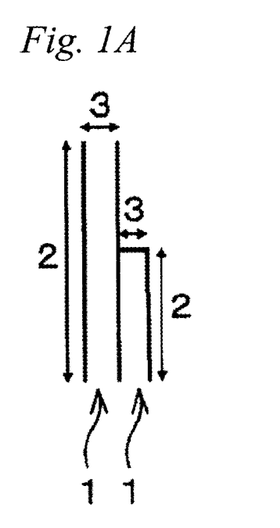
FIGS. 1A to 1C are schematic diagrams of a columnar texture oriented in the longitudinal direction of the porous hollow-fiber membrane specified in the present invention.
Figure 1B:
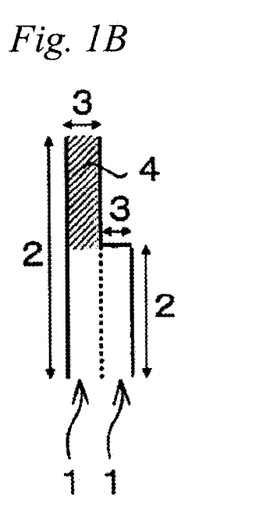
Figure 1C:
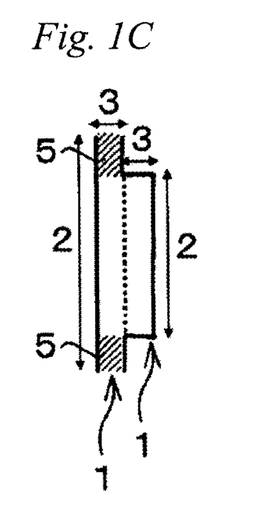

Incidentally, the columnar texture may be partially connected to a columnar texture other than the columnar texture described above or to another texture. In this case, whether the texture comes under the columnar texture or not may be judged according to the schematic diagrams illustrated in FIG. 1(1) to FIG. 1(3).

In the case where the boundary line between textures can be recognized as in FIG. 1A, respective textures divided are judged whether the texture is a columnar texture or not from the aspect ratio.

In the case where a texture 4 judged as a columnar texture can be recognized as in FIG. 1B, the texture corresponding to a portion extended in the longitudinal direction is also judged as the same columnar texture (in this case, the longitudinal length and short-side length of the texture 1 are denoted by symbols 2 and 3, respectively, and the boundary line between textures is indicated by a dotted line).

In the case where one texture 5 looking like part of a columnar texture despite an aspect ratio of less than 3 is, when extended in the longitudinal direction thereof, connected to another texture 5 looking like part of a columnar texture other than the one texture 5 as in FIG. 1C, all of those two textures 5 and 5 and a texture corresponding to the extended portion are judged as the same texture (in this case, the longitudinal length and short-side length of the texture 1 are denoted by symbols 2 and 3, respectively, and the boundary line between textures is indicated by a dotted line).

(1-3) Proportion of Area of Void Portion

In the porous hollow-fiber membrane of the present invention, in order to satisfy both high pure-water permeation performance and high strength-elongation performance, the proportion of the area of the void portion when binarizing the photograph of a cross-section parallel to the longitudinal direction of the porous hollow-fiber membrane into a structure portion including a resin and a void portion is from 20 to 50%.

The proportion of the area of the void portion is preferably from 25 to 45%, more preferably from 30 to 40%. If the proportion of the area of the void portion is less than 20%, water passage is lacked, and the pure-water permeation performance is reduced. On the contrary, if the proportion exceeds 50%, the structure portion is lacked and since the strength-elongation is significantly reduced, the membrane may lack suitability as a porous hollow-fiber membrane for water treatment.

The proportion of the area of the void portion in the photograph of a cross-section parallel to the longitudinal direction of the porous hollow-fiber membrane is determined according to the following formula (2). In order to increase the accuracy, it is preferable to determine the proportion of the area of the void portion for cross-sections at arbitrary 5 points or more, preferably 10 points or more, and use an average value thereof.

Proportion of area of void portion (%)={(area of void portion)}/{(area of entire photograph)}×100  (2)

For obtaining the above-described photograph of a cross-section parallel to the longitudinal direction of the porous hollow-fiber membrane, SEM is preferably used. The observation magnification may be sufficient if it is a magnification enabling clear identification of a structure portion, and, for example, a magnification of 1,000 to 5,000 times may be used. In addition, the observation visual field may be sufficient if it is a rectangular visual field with one-side length being from 10 to 50 times the short-side length of the structure texture.

This cross-sectional photograph is binarized into a structure portion including a resin and a void portion with a threshold capable of distinguishing the contour of the structure portion, by using an image processing software. For the binarization processing, a general image processing software can be used, and examples thereof include a software such as ImageJ (Wayne Rasband, National Institutes of Health). The cross-sectional photograph obtained after binarization processing can be used also in the section "(1-4) Crack in Columnar Texture" below.

(1-4) Crack in Columnar Texture

In order for the porous hollow-fiber membrane to exhibit excellent bending resistance performance, it is necessary that the number of cracks working out an origin of fracture is small in the structure portion of the porous hollow-fiber membrane. In the porous hollow-fiber membrane of the present invention, the crack can be classified into two types.

One is a crack within the columnar texture and is a locally narrow constricted portion within the columnar texture. In this connection, as described in the section "(1-2) Columnar Texture", when the coefficient of variation of the short-side length of the columnar texture is 0.2 or less, the columnar texture advantageously has high thickness uniformity and a small number of constricted portions.

Another is a crack between columnar textures and is a portion in which the coupling between columnar textures is incomplete. More specifically, the number of cracks between columnar textures is smaller in a structure where columnar textures are tightly coupled and exist together, than in a structure where columnar textures are dispersed and coupling of columnar textures with each other is only partially formed.

The present inventors have found that a value obtained by dividing the total of peripheral lengths of void portions determined upon binarization of the photograph of a cross-section parallel to the longitudinal direction of the porous hollow-fiber membrane by the total of areas of the void portions is used as the method for expressing the degree of coupling of columnar textures with each other.

More specifically, in the photograph of a cross-section parallel to the longitudinal direction of the porous hollow-fiber membrane, when the peripheral length of a certain void portion is small relative to the area of the void portion, this means that the interface between the void portion and the structure portion is less uneven and void portions exist together. In other words, it means that since the surface of the structure portion is smooth and structure portions exist together, an incomplete coupling between columnar textures, which is a crack working out to an origin of the fracture, is less formed.

In the porous hollow-fiber membrane of the present invention, in order to exhibit excellent bending resistance performance, the above-described value obtained by dividing the total of peripheral lengths of void portions by the total of areas of the void portions is 2.0 $\mu m^{-1}$ or less, preferably 1.8 $\mu m^{-1}$ or less. The lower limit is not particularly limited but usually, is 1.2 $\mu m^{-1}$ or more.

If the value obtained by dividing the total of peripheral lengths of void portions by the total of areas of the void portions exceeds 2.0 $\mu m^{-1}$, columnar textures exist dispersedly, leading to an incomplete coupling of columnar textures with each other, and many cracks are formed between columnar textures, resulting in reduction of the bending resistance.

When the porous hollow-fiber membrane keeps high bending resistance performance, the transmembrane pressure can be raised and therefore, the amount of water treated can be advantageously increased. In addition, physical membrane cleaning such as air bubbling can be intensified during operation of a separation membrane module, so that contamination such as suspended matter adhering to the membrane surface can be efficiently removed and at the same time, the service life of the membrane can be advantageously enhanced. The bending resistance performance can be determined by measuring the folding resistance. The folding resistance of the porous hollow-fiber membrane is preferably 75,000 times or more, and it is more preferable to cause no breakage on folding 100,000 times.

(1-5) Others

In the porous hollow-fiber membrane of the present invention, it is preferred that the pure-water permeation performance at 50 kPa and 25° C. is 0.7 $m^3/m^2/hr$ or more and the breaking strength at 25° C. is 25 MPa or more More preferably, the pure-water permeation performance at 50 kPa and 25° C. is 0.7 $m^3/m^2/hr$ or more and the breaking strength at 25° C. is 30 MPa or more.

Above all, from the viewpoint of forming a high-performance hollow-fiber membrane satisfying both high pure-water permeation performance and high strength performance, it is preferred that the pure-water permeation performance at 50 kPa and 25° C. is from 0.7 to 5.0 $m^3/m^2/hr$ and the breaking strength at 25° C. is from 25 to 70 MPa, and it is more preferred that the pure-water permeation performance at 50 kPa and 25° C. is from 0.7 to 5.0 $m^3/m^2/hr$ and the breaking strength at 25° C. is from 30 to 70 MPa.

The measurement of pure-water permeation performance is performed by manufacturing a miniature module of 200 mm in length including 4 porous hollow-fiber membranes. External-pressure dead-end filtration of reverse osmosis membrane filtration is performed for 10 minutes under the conditions of a temperature of 25° C. and a filtration pressure difference of 16 kPa, and the permeation amount ($m^3$) is determined. The permeation amount ($m^3$) is converted into a value per unit time (hr) and effective membrane area ($m^2$) and further multiplied by (50/16), thereby being converted into a value at a pressure of 50 kPa, and the pure-water permeation performance is thus determined.

The methods for measuring the breaking strength and the elongation at break are not particularly limited but, for example, using a tensile tester, a tensile test of a sample having a measurement length of 50 mm is performed 5 or more times at a tensile speed of 50 mm/min by changing the sample, and the breaking strength and the elongation at break can be measured by determining average values thereof.

The dimension or shape of the porous hollow-fiber membrane is not limited to a specific form. Specifically, the outer diameter thereof is preferably from 0.3 mm to 3.0 mm.

The porous hollow-fiber membrane described hereinbefore has sufficient pure-water permeation performance, strength, elongation and bending resistance for various water treatments such as drinking water production, industrial water production, water purification treatment, wastewater treatment and seawater desalination.

2. Production Method of Porous Hollow-Fiber Membrane

The method for producing the porous hollow-fiber membrane of the present invention is described below by way of example. The method for producing the porous hollow-fiber membrane includes at least a step of forming a hollow fiber having a columnar texture oriented in the longitudinal direction from a membrane-forming raw liquid containing a fluororesin-based polymer by thermally induced phase separation.

(2-1) Preparation of Membrane-Forming Raw Liquid

The production method of a porous hollow-fiber membrane in the present invention includes a step of preparing a membrane-forming raw liquid containing a fluororesin-based polymer solution. A fluororesin-based polymer solution (a membrane-forming raw liquid) is prepared by dissolving a fluororesin-based polymer in a poor or good solvent for the fluororesin-based polymer at a relatively high temperature of not less than the crystallization temperature.

When the polymer concentration in the membrane-forming raw liquid is high, a porous hollow-fiber membrane having high strength is obtained. On the other hand, when the polymer concentration is low, the porosity of the porous hollow-fiber membrane becomes large, and the pure-water permeation performance is enhanced. Accordingly, the concentration of the fluororesin-based polymer is preferably from 20 to 60 wt %, more preferably from 30 to 50 wt %.

In the present description, the poor solvent is a solvent in which the fluororesin-based polymer cannot be dissolved in a concentration of 5 wt % or more at a low temperature of 60° C. or less but can be dissolved in a concentration of 5 wt % or more in a high-temperature region between 60° C. or more and not more than the melting point of the fluororesin-based polymer (for example, when the polymer is composed of a vinylidene fluoride homopolymer alone, about 178° C.).

In the present description, the good solvent is a solvent in which the fluororesin-based polymer can be dissolved in a concentration of 5 wt % or more even in a low-temperature region of 60° C. or less, and the non-solvent is defined as a solvent in which the fluororesin-based polymer is neither dissolved nor swollen at a temperature up to the melting point of the fluororesin-based polymer or the boiling point of the solvent.

Here, the poor solvent for the fluororesin-based polymer include, for example, cyclohexanone, isophorone, γ-butyrolactone, methyl isoamyl ketone, propylene carbonate, dimethyl sulfoxide, etc., and a mixed solvent thereof.

The good solvent includes, for example, N-methyl-2-pyrrolidone, dimethylacetamide, dimethylformamide, methyl ethyl ketone, acetone, tetrahydrofuran, tetramethylurea, trimethyl phosphate, etc., and a mixed solvent thereof.

The non-solvent includes, for example, water, hexane, pentane, benzene, toluene, methanol, ethanol, carbon tetrachloride, o-dichlorobenzene, trichloroethylene, ethylene glycol, diethylene glycol, triethylene glycol, propylene glycol, butylene glycol, pentanediol, hexanediol, an aliphatic hydrocarbon such as low-molecular-weight polyethylene glycol, an aromatic hydrocarbon, an aliphatic polyhydric alcohol, an aromatic polyhydric alcohol, a chlorinated hydrocarbon, other chlorinated organic liquids, and a mixed solvent thereof.

(2-2) Formation of Hollow Fiber

In the hollow fiber forming step, a hollow fiber is obtained from a membrane-forming raw liquid containing a fluororesin-based polymer by utilizing a thermally induced phase separation method of inducing phase separation by temperature change. In order to perform the later-described high-ratio drawing of 1.8 times or more, it is preferred that the hollow fiber has a columnar texture oriented in its longitudinal direction and the coefficient of variation of the short-side length of the columnar texture is 0.2 or less.

In the thermally induced phase separation method, two kinds of phase separation mechanisms are mainly utilized. One is a liquid-liquid phase separation method in which a polymer solution dissolved uniformly at a high temperature is separated into a polymer thick phase and a polymer thin phase due to reduction in the dissolving ability of the solution during temperature drop and the structure is thereafter fixed by crystallization. Another is a solid-liquid phase separation method in which a polymer solution dissolved uniformly at a high temperature is phase-separated into a polymer solid phase and a solvent phase due to occurrence of crystallization of the polymer during temperature drop.

A three-dimensional network structure is mainly formed in the former method, and a spherical structure constituted by a spherical texture is mainly formed in the latter method. In the production of the hollow-fiber membrane of the present invention, the latter phase separation mechanism is preferably utilized, and a polymer concentration and a solvent each inducing solid-liquid phase separation are selected.

In the former phase separation mechanism, it is difficult to develop the above-described columnar texture oriented in the longitudinal direction of the hollow-fiber membrane. Because, the polymer thick phase forms a very fine phase by phase separation before the structure is fixed, and cannot be made columnar.

As a specific method, a hollow portion-forming liquid is ejected through an inner tube of a double tube-type spinneret for spinning of a porous hollow-fiber membrane while ejecting the above-described membrane-forming raw liquid through an outer tube of the double tube-type spinneret. The thus-ejected membrane-forming raw liquid is cooled and solidified in a cooling bath to obtain a porous hollow-fiber membrane.

The fluororesin-based polymer solution is, before ejection through the spinneret, placed under a specific temperature condition for a given time while being subjected to a pressure. The pressure is preferably 0.5 MPa or more, more preferably 1.0 MPa or more.

The temperature T of the polymer solution preferably satisfies $Tc+35°\ C.\leq T\leq Tc+60°\ C.$, more preferably satisfies $Tc+40°\ C.\leq T\leq Tc+55°\ C.$ Tc is the crystallization temperature of the fluororesin-based polymer solution. The time for which the polymer solution is held under these pressure and temperature is preferably 10 seconds or more, more preferably 20 second or more.

Specifically, a staying part for allowing the polymer solution to stay is provided at any site of a solution sending line of delivering the polymer solution to the spinneret, and a pressurizing unit for applying a pressure to the staying polymer solution and a temperature-adjusting unit for adjusting the temperature of the staying polymer solution (for example, a heating unit) are provided.

The pressurizing unit is not particularly limited, but by disposing two or more pumps in the solution sending line, a pressure can be applied at any site therebetween. The pump includes, for example, a piston pump, a plunger pump, a diaphragm pump, a wing pump, a gear pump, a rotary pump, and a screw pump, and two or more kinds of pumps may be used.

Since this step allows a pressure to be applied under the conditions favorable to crystallization, it is presumed that crystal growth has anisotropy and in turn, not an isotropic spherical structure but a texture oriented in the longitudinal direction of the porous hollow-fiber membrane is developed, as a result, a columnar structure is obtained.

Here, the crystallization temperature Tc of the fluororesin-based polymer solution is defined as follows. Using an apparatus for differential scanning calorimetry (DSC measurement), a mixture having the same composition as the membrane-forming polymer raw liquid composition containing a fluororesin-based polymer, a solvent, etc. is sealed in a sealing type DSC container and uniformly dissolved by raising the temperature to a dissolution temperature at a temperature rise rate of 10° C./min and holding the temperature for 30 minutes, and Tc is a rise temperature of a crystallization peak observed in the process of thereafter lowering the temperature at a temperature drop rate of 10° C./min.

The cooling bath for cooling the fluororesin-based polymer solution ejected through the spinneret is described below. In the cooling bath, a mixed liquid including a poor or good solvent in a concentration of 50 to 95 wt % and a non-solvent in a concentration of 5 to 50 wt % is preferably used. As the poor solvent, the same poor solvent as that for the polymer solution is preferably used.

For the hollow portion-forming liquid, as with the cooling bath, a mixed liquid including a poor or good solvent in a concentration of 50 to 95 wt % and a non-solvent in a concentration of 5 to 50 wt % is preferably used. As the poor solvent, the same poor solvent as that for the polymer solution is preferably employed.

Here, when a texture having a coefficient of variation of the short-side length of more than 0.2 is referred to as "fibrous texture" so as to distinguish it from the columnar texture, in order not to develop a fibrous texture having a large number of constricted portions or a columnar texture suffering from incomplete coupling between textures but to develop a columnar texture having a uniform thickness and forming a tight coupling between textures, it is preferable to promote polymer uptake/growth into the constricted portion.

The present inventors have conceived that the polymer uptake/growth into the constricted portion or coupling portion leads to disappearance of a constricted portion having high interface energy or an incomplete coupling portion and can be energetically stabilized and in turn caused to preferentially occur over the growth in portions other than the constricted portion or coupling portion, and have made intensive studies on the method for enhancing the thickness uniformity.

As a result, it has been found that one of the methods for promoting the polymer uptake/growth into the constricted portion or coupling portion is to allow the cooling/solidification to slowly proceed. Specifically, cooling/solidification in a cooling bath is performed near the crystallization temperature of the polymer solution. That is, denoting Tb as the temperature of the cooling bath and Tc as the crystallization temperature of the fluororesin-based polymer, Tc−5°

C.<Tb≤Tc is satisfied; or a good solvent or among poor solvents, a solvent having a relatively large solubility is used.

In order to obtain a porous hollow-fiber membrane having excellent thickness uniformity and forming a tight coupling between textures, the passing time through the cooling bath (i.e., dipping time in the cooling bath) is preferably set to be as long as possible. For achieving sufficient progress of thermally induced phase separation including polymer intake/growth into the constricted portion or coupling portion, the passing time needs to be at least 30 seconds or more and is preferably 40 seconds or more, more preferably 50 seconds or more.

In addition, it is more preferable to perform two or more stages of cooling. Specifically, the cooling step preferably includes a step of cooling the solution by using a first cooling bath for promoting the polymer intake/growth into the constricted portion or coupling portion, and a step of thereafter cooling the solution by using a second cooling bath for completing the solidification. The cooling step by the first cooling bath utilizes a phenomenon that the polymer uptake/growth into the constricted portion or coupling portion preferentially occurs mainly in the structure coarsening process of phase separation.

In this case, when the temperature Tb1 of the first cooling bath is set near the crystallization temperature (specifically, set to satisfy Tc−5° C.<Tb1≤Tc), the polymer uptake/growth into the constricted portion or coupling portion can be promoted, and when the temperature Tb2 of the second cooling bath is set to be a lower temperature (Tb2<Tb1), solidification can be completed. Tc is the crystallization temperature of the polymer solution.

As for the passing time through each cooling bath, the passing time through the first cooling bath is set to be preferably 20 seconds or more, more preferably 30 seconds or more, still more preferably 40 seconds or more. It is recommended to set the passing time through the second cooling bath to be preferably from 1 to 20 seconds, more preferably from 3 to 15 seconds, more preferably from 5 to 15 seconds.

The porous hollow-fiber membrane including a fluororesin-based polymer and having a columnar texture with high thickness uniformity and tight coupling between textures exhibits high bending resistance in the short-side direction, in addition to high strength-elongation performance in the longitudinal direction, and has drastically enhanced physical durability, as compared with conventional techniques.

(2-3) Drawing

Finally, in the present invention, the porous hollow-fiber membrane including a fluororesin-based polymer and having a columnar texture, obtained by the method above, is preferably drawn at a high ratio, because the porosity of the porous hollow-fiber membrane can be increased and high pure-water permeation performance as well as excellent physical durability can be imparted.

The draw ratio is preferably from 1.8 to 4.0 times, more preferably from 2.0 to 3.5 times, still more preferably from 2.0 to 3.0 times. If the draw ratio is less than 1.8 times, the porosity is not sufficiently increased, and if the draw ratio exceeds 4.0 times, reduction of the elongation increases.

The drawing temperature is preferably from 60 to 140° C., more preferably from 70 to 120° C., still more preferably from 80 to 100° C., and if the membrane is drawn in a low-temperature atmosphere of less than 60° C., it is difficult to stably and homogeneously draw the membrane. If the membrane is drawn at a temperature exceeding 140° C., since the temperature is close to the melting point of the fluororesin-based polymer, the structure texture may be melted to reduce the pure-water permeation performance.

Drawing in a liquid is preferred, because the temperature control is easy, but the drawing may also be performed in a gas such as steam. As the liquid, water is simple and preferred, but in case of drawing at about 90° C. or more, use of a low-molecular-weight polyethylene glycol, etc. may be preferably employed as well.

EXAMPLES

The present invention is described below by referring to specific Examples, but the present invention is not limited by these Examples in any way. Incidentally, physical property values relating to the present invention can be measured by the following methods.

(1) Pure-Water Permeation Performance

A compact module including 4 porous hollow-fiber membranes and having an effective length of 200 mm was manufactured. Distilled water was delivered to the module over 10 minutes under the conditions of a temperature of 25° C. and a filtration pressure difference of 16 kPa, and the amount ($m^3$) of the obtained permeate was measured, converted into a value per unit time (hr) and unit membrane area ($m^2$), further converted in terms of a pressure (50 kPa), and used as the pure-water permeation performance ($m^3/m^2/hr$). The unit membrane area was calculated from the average outer diameter and the effective length of the porous hollow-fiber membrane.

(2) Breaking Strength, Elongation at Break

The porous hollow-fiber membrane was cut to a length of 110 mm in the longitudinal direction. Using a tensile tester (TENSILON (registered trademark)/RTG-1210, manufactured by Toyo Baldwin Co., Ltd.), a sample having a measurement length of 50 mm was measured 5 or more times at a tensile speed of 50 mm/min by changing the sample in an atmosphere at 25° C., and average values of breaking strength (MPa) and elongation at break (%) were determined.

(3) Folding Resistance

The porous hollow-fiber membrane was cut to a length of 150 mm in the longitudinal direction. Using a MIT folding resistance tester (described in JIS P8115), a sample was folded left and right at 135° under a load of 500 gf at a rate of 175 times/min. The number of folding reciprocations until the sample was broken, i.e., the folding resistance, was measured 5 times, and an average value thereof was determined. Here, the measurement upper limit was set to 100,000 times, and when the upper limit is reached, it was judged that the sample is not broken under these conditions.

(4) Area of Void Portion in Cross-Section, Peripheral Length, and Proportion of Area of Void Portion in Cross-Section A cross-section parallel to the longitudinal direction of the porous hollow-fiber membrane was photographed under SEM at a magnification of 3,000 times in a rectangular visual field in which the short side is about 20 times the short-side length of the columnar or fibrous texture and the long side is about 30 times the short-side length of the columnar or fibrous texture. The obtained cross-sectional photograph was binarized into a structure portion including a resin and a void portion, and each of the total of areas of void portions, the total of peripheral lengths of void portions, and the proportion of the area of the void portion in the cross-section was calculated. Here, each of the total of areas of void portions, the total of peripheral lengths of void portions, and the proportion of the area of the void portion in the cross-section was determined by calculating an average value of arbitrary 10 cross-sectional photographs.

(5) Longitudinal Length and Short-Side Length of Columnar or Fibrous Texture and Coefficient of Variation of Short-Side Length With respect to a porous hollow-fiber membrane having a columnar or fibrous texture, the longitudinal length and short-side length of the columnar or fibrous texture and the coefficient of variation of the short-side length were determined for 5 columnar or fibrous textures on each photograph of the arbitrary 10 cross-sectional photographs obtained in "(4) Area of Void Portion in Cross-Section, Peripheral Length, and Proportion of Area of Void Portion in Cross-Section", and average values thereof were used. Here, the short-side length of each columnar or fibrous texture was determined by measuring the length in the short-side direction at arbitrary 20 points within the texture and calculating an average value thereof. Based on this value, the aspect ratio (longitudinal length/short-side length) of the columnar or fibrous texture was determined. In addition, the coefficient of variation of the short-side length of the columnar or fibrous texture was determined by measuring the length in the short-side direction at arbitrary 20 points within the texture and dividing the standard deviation thereof by the average value.

(6) Occupancy of Columnar Texture

With respect to the porous hollow-fiber membrane, the occupancy of the columnar texture was determined according to the following formula (1) on the arbitrary 10 cross-sectional photographs obtained in "(4) Area of Void Portion in Cross-Section, Peripheral Length, and Proportion of Area of Void Portion in Cross-Section", and an average value thereof was used. Incidentally, the structure portion is a portion including a resin in the cross-section. Here, the area occupied by the structure portion and the area occupied by the columnar texture were determined by printing the taken photograph on paper and converting respective areas into the weight of paper corresponding to the structure portion and the weight of paper corresponding to the columnar texture portion cut out therefrom.

Occupancy of columnar texture (%)={(area occupied by columnar texture)/(area occupied by structure portion)}×100   (1)

(7) Crystallization Temperature Tc of Fluororesin-Based Polymer Solution

Using a differential scanning calorimetry (DSC-6200 manufactured by Seiko Instruments & Electronics Ltd.), a mixture having the same composition as the membrane-forming polymer raw liquid composition containing a fluororesin-based polymer, a solvent, etc. was sealed in a sealing type DSC container and uniformly dissolved by raising the temperature to a dissolution temperature at a temperature rise rate of 10° C./min and holding the temperature for 30 minutes, and a rise temperature of a crystallization peak observed in the process of thereafter lowering the temperature at a temperature drop rate of 10° C./min was taken as the crystallization temperature Tc.

Example 1

35 wt % of a vinylidene fluoride homopolymer (KF1300, produced by Kureha Corporation, weight average molecular weight: 417,000, number average molecular weight: 221, 000) and 65 wt % of dimethylsulfoxide were dissolved at 130° C. Tc of this vinylidene fluoride homopolymer solution was 26° C. The solution was allowed to stay on a line between two gear pumps for 20 seconds at 78 to 80° C. under a pressure of 2.0 MPa by disposing those gear pumps and then ejected through the outer tube of a double tube-type spinneret, and an aqueous 90 wt % dimethylsulfoxide solution was simultaneously ejected through the inner tube of the double tube-type spinneret. The solution ejected was allowed to stay in a first cooling bath at a temperature of 25° C. containing an aqueous 85 wt % dimethylsulfoxide solution for 50 seconds and then stay in a second cooling bath at a temperature of 0° C. containing an aqueous 85 wt % dimethylsulfoxide solution for 15 seconds to cause solidification, followed by drawing to 2.0 times in water at 95° C. The structure and performance of the obtained porous hollow-fiber membrane are shown in Table 1.

Example 2

The operation from solution preparation to solution ejection was performed in the same manner as in Example 1. The solution ejected was allowed to stay in a first cooling bath at a temperature of 25° C. containing an aqueous 85 wt % dimethylsulfoxide solution for 50 seconds and then stay in second cooling bath at a temperature of −5° C. containing an aqueous 85 wt % of dimethylsulfoxide for 10 seconds to cause solidification, followed by drawing to 2.4 times in water at 95° C. The structure and performance of the obtained porous hollow-fiber membrane are shown in Table 1.

Example 3

Figure 2:
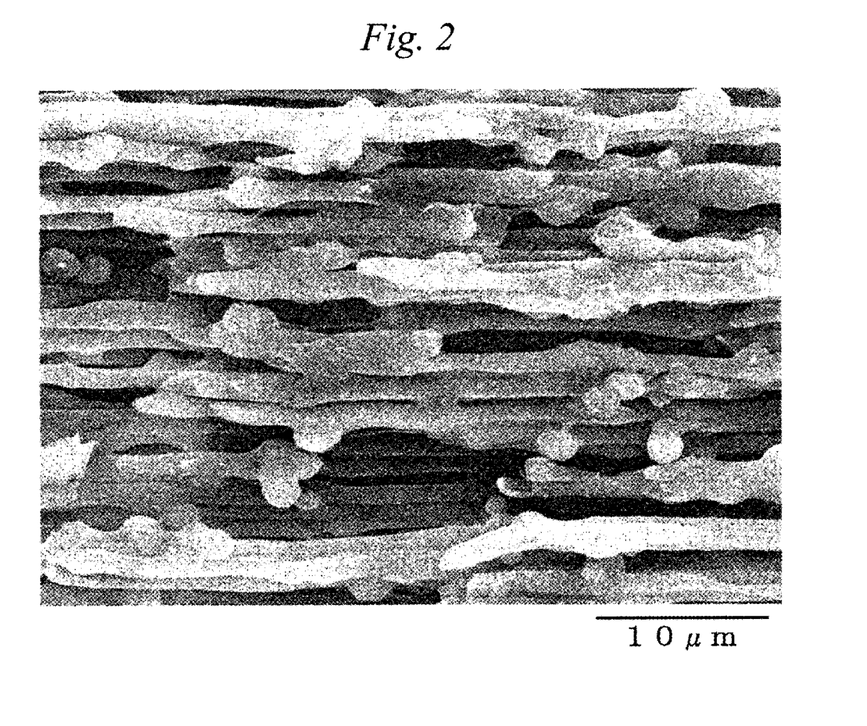
FIG. 2 is a diagram illustrating a photograph of a cross-section parallel to the longitudinal direction of the porous hollow-fiber membrane of Example 3.
Figure 3:
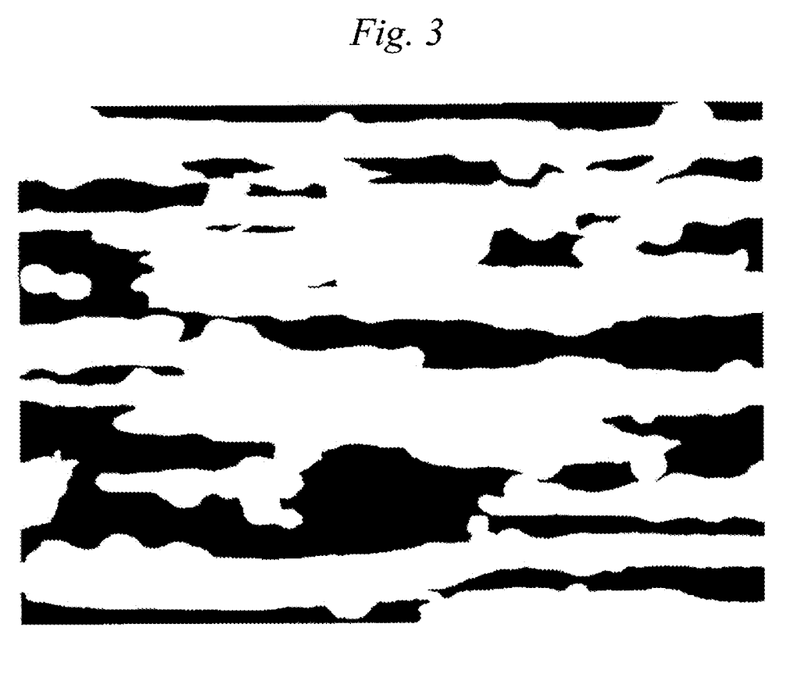
FIG. 3 is a diagram illustrating a photograph after binarizing the photograph illustrated in FIG. 2 into a structure portion including a resin and a void portion.

The operation from solution preparation to solution solidification was performed in the same manner as in Example 2, followed by drawing to 3.0 times in water at 95° C. The structure and performance of the obtained porous hollow-fiber membrane are shown in Table 1. FIG. 2 illustrates an SEM photograph of a cross-section parallel to the longitudinal direction of the obtained porous hollow-fiber membrane, and FIG. 3 illustrates a photograph after binarization of FIG. 2.

Example 4

40 wt % of a vinylidene fluoride homopolymer (KF1300, produced by Kureha Corporation, weight average molecular weight: 417,000, number average molecular weight: 221, 000) and 60 wt % of dimethylsulfoxide were dissolved at 130° C. Tc of this vinylidene fluoride homopolymer solution was 30° C. The solution was allowed to stay on a line between two gear pumps for 20 seconds at 78 to 80° C. under a pressure of 2.0 MPa by disposing those gear pumps and then ejected through the outer tube of a double tube-type spinneret, and an aqueous 90 wt % dimethylsulfoxide solution was simultaneously ejected through the inner tube of the double tube-type spinneret. The solution ejected was allowed to stay in a first cooling bath at a temperature of 28° C. containing an aqueous 85 wt % dimethylsulfoxide solution for 50 seconds and then stay in a second cooling bath at a temperature of −5° C. containing an aqueous 85 wt % dimethylsulfoxide solution for 10 seconds to cause solidification, followed by drawing to 3.5 times in water at 95° C. The structure and performance of the obtained porous hollow-fiber membrane are shown in Table 1.

Comparative Example 1

35 wt % of a vinylidene fluoride homopolymer (KF1300, produced by Kureha Corporation, weight average molecular weight: 417,000, number average molecular weight: 221,000) and 65 wt % of γ-butyrolactone were dissolved at 150° C. Tc of this vinylidene fluoride homopolymer solution was 47° C. The solution was allowed to stay on a line between two gear pumps for 20 seconds at 99 to 101° C. under a pressure of 2.0 MPa by disposing those gear pumps and then ejected through the outer tube of a double tube-type spinneret, and an aqueous 85 wt % γ-butyrolactone solution was simultaneously ejected through the inner tube of the double tube-type spinneret. The solution ejected was allowed to stay in a cooling bath at a temperature of 25° C. containing an aqueous 85 wt % γ-butyrolactone solution for 50 seconds to cause solidification, followed by drawing to 2.5 times in water at 95° C. The structure and performance of the obtained porous hollow-fiber membrane are shown in Table 1.

Comparative Example 2

38 wt % of a vinylidene fluoride homopolymer (KF1300, produced by Kureha Corporation, weight average molecular weight: 417,000, number average molecular weight: 221,000) and 62 wt % of γ-butyrolactone were dissolved at 150° C. Tc of this vinylidene fluoride homopolymer solution was 51° C. The solution was allowed to stay on a line between two gear pumps for 23 seconds at 99 to 101° C. under a pressure of 1.4 MPa by disposing those gear pumps and then ejected through the outer tube of a double tube-type spinneret, and an aqueous 85 wt % γ-butyrolactone solution was simultaneously ejected through the inner tube of the double tube-type spinneret. The solution ejected was allowed to stay in a cooling bath at a temperature of 13° C. containing an aqueous 85 wt % γ-butyrolactone solution for 40 seconds to cause solidification, followed by drawing to 1.5 times in water at 95° C. The structure and performance of the obtained porous hollow-fiber membrane are shown in Table 1.

Comparative Example 3

28 wt % of a vinylidene fluoride homopolymer (KF1300, produced by Kureha Corporation, weight average molecular weight: 417,000, number average molecular weight: 221,000) and 72 wt % of dimethylsulfoxide were dissolved at 120° C. Tc of this vinylidene fluoride homopolymer solution was 20° C. The solution was allowed to stay on a line between two gear pumps for 22 seconds at 64 to 66° C. under a pressure of 2.0 MPa by disposing those gear pumps and then ejected through the outer tube of a double tube-type spinneret, and an aqueous 90 wt % dimethylsulfoxide solution was simultaneously ejected through the inner tube of the double tube-type spinneret. The solution ejected was allowed to stay in a cooling bath at a temperature of 10° C. containing an aqueous 85 wt % dimethylsulfoxide solution for 40 seconds to cause solidification, followed by drawing to 1.4 times in water at 95° C. The structure and performance of the obtained porous hollow-fiber membrane are shown in Table 1.

Comparative Example 4

15 wt % of a vinylidene fluoride homopolymer (KF1300, produced by Kureha Corporation, weight average molecular weight: 417,000, number average molecular weight: 221,000) and 85 wt % of dimethylacetamide were dissolved at 100° C. Since dimethylacetamide is a good solvent for the vinylidene fluoride homopolymer, the vinylidene fluoride homopolymer solution above did not have Tc. The solution was allowed to stay on a line between two gear pumps for 20 seconds at 99 to 101° C. under a pressure of 0.2 MPa by disposing those gear pumps and then ejected through the outer tube of a double tube-type spinneret, and an aqueous 85 wt % dimethylacetamide solution was simultaneously ejected through the inner tube of the double tube-type spinneret. The solution ejected was allowed to stay in a cooling bath at a temperature of 25° C. containing an aqueous 85 wt % dimethylacetamide solution for 40 seconds to cause solidification. The obtained porous hollow-fiber membrane did not have a spherical texture, a fibrous texture and a columnar texture but had a three-dimensional network texture. The structure and performance of the obtained porous hollow-fiber membrane are shown in Table 1.

TABLE 1

| | | | Example | | | | Comparative Example | | | |
|---|---|---|---|---|---|---|---|---|---|---|
| | | unit | 1 | 2 | 3 | 4 | 1 | 2 | 3 | 4 |
| Production method | Fluororesin-based polymer concentration | wt % | 35 | 35 | 35 | 40 | 35 | 38 | 28 | 15 |
| | Kind of solvent  dimethylsulfoxide | wt % | 65 | 65 | 65 | 60 | — | — | 72 | — |
| | γ-butyrolactone | wt % | — | — | — | — | 65 | 62 | — | — |
| | dimethylacetamide | wt % | — | — | — | — | — | — | — | 85 |
| | Crystallization temperature Tc | ° C. | 26 | 26 | 26 | 30 | 47 | 51 | 20 | — |
| | Temperature of first cooling bath | ° C. | 25 | 25 | 25 | 28 | 25 | 13 | 10 | 25 |
| | Time in first cooling bath | sec | 50 | 50 | 50 | 50 | 50 | 40 | 40 | 40 |
| | Temperature of second cooling bath | ° C. | 0 | −5 | −5 | −5 | — | — | — | — |
| | Time in second cooling bath | sec | 15 | 10 | 10 | 10 | — | — | — | — |
| | Draw ratio | times | 2.0 | 2.4 | 3.0 | 3.5 | 2.5 | 1.5 | 1.4 | — |
| Structure | Proportion of area of void portion in cross-section | % | 28 | 30 | 33 | 37 | 28 | 22 | 24 | 22 |
| | Peripheral length of void portion in cross-section/area of void portion in cross-section | μm$^{-1}$ | 1.9 | 1.8 | 1.6 | 1.5 | 2.2 | 2.4 | 2.3 | 16.4 |
| | Occupancy of columnar texture | % | 78 | 83 | 91 | 90 | 0 | 0 | 0 | 0 |
| | Short-side length of columnar or fibrous texture | μm | 2.2 | 1.7 | 1.2 | 1.0 | 1.5 | 2.2 | 1.9 | — |
| | Coefficient of variation of short-side length of columnar or fibrous texture | — | 0.11 | 0.10 | 0.08 | 0.08 | 0.34 | 0.39 | 0.45 | — |
| | Aspect ratio of columnar or fibrous texture | — | 10 | 15 | 26 | 32 | 14 | 7 | 7 | — |

TABLE 1-continued

| | | unit | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Performance | Pure-water permeation performance | $m^3/m^2/hr$ | 1.7 | 2.0 | 2.5 | 2.7 | 2.5 | 2.5 | 1.0 | 1.2 |
| | Breaking strength | MPa | 29 | 38 | 55 | 62 | 35 | 13 | 13 | 3 |
| | Elongation at break | % | 136 | 105 | 91 | 73 | 94 | 130 | 230 | 25 |
| | Folding resistance | times | no breakage on folding 100,000 times (measurement upper limit) | | | | 59000 | 72000 | 45000 | 20 |

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2016-034668) filed on Feb. 25, 2016, the entirety of which is incorporated herein by way of reference.

INDUSTRIAL APPLICABILITY

According to the present invention, a porous hollow-fiber membrane having excellent chemical durability owing to a fluororesin-based polymer with high chemical resistance and at the same time, having both excellent physical durability and high pure-water permeation performance is provided. Consequently, when the porous hollow-fiber membrane is applied to a water treatment field, filtration can be stably performed for a long period of time under a high transmembrane pressure while performing chemical cleaning.

DESCRIPTION OF REFERENCE NUMERALS AND SIGNS

1 Columnar texture
2 Longitudinal length of columnar texture
3 Short-side length of columnar texture
4 Texture judged as part of columnar texture
5 Texture judged as part of columnar texture despite an aspect ratio of less than 3

The invention claimed is:

1. A porous hollow-fiber membrane comprising a fluororesin-based polymer,
   wherein the porous hollow-fiber membrane has a columnar texture oriented in a longitudinal direction of the porous hollow-fiber membrane,
      wherein the columnar texture accounts for 70% or more of the porous hollow-fiber membrane,
   wherein when a photograph of a cross-section parallel to the longitudinal direction of the porous hollow-fiber membrane is binarized into a structure portion and a void portion, the following 1) and 2) are satisfied:
   1) a proportion of an area of the void portion is from 20 to 50%, and
   2) a value obtained by dividing a total of peripheral lengths of the void portions by a total of areas of the void portions is 2.0 $\mu m^{-1}$ or less, and
   wherein a coefficient of variation obtained by dividing a standard deviation of a short-side length of the columnar texture by an average value of the short-side length of the columnar texture is 0.2 or less.

2. The porous hollow-fiber membrane according to claim 1, wherein the columnar texture has the short-side length of from 0.5 µm to 3.0 µm.

3. The porous hollow-fiber membrane according to claim 1, wherein an aspect ratio of the columnar texture is from 3 to 50.

4. The porous hollow-fiber membrane according to claim 1, having a breaking strength at 25° C. of 25 MPa or more.

5. The porous hollow-fiber membrane according to claim 1, wherein when a photograph of a cross-section parallel to the longitudinal direction of the porous hollow-fiber membrane is binarized into the structure portion and the void portion, the value obtained by dividing the total of the peripheral lengths of the void portions by the total of the areas of the void portions is 1.2 $\mu m^{-1}$ or more.

6. The porous hollow-fiber membrane according to claim 1, wherein the columnar texture accounts for 78% or more of the porous hollow-fiber membrane.

7. The porous hollow-fiber membrane according to claim 1, wherein the columnar texture has the short-side length of from 1.0 µm to 2.5 µm.

8. The porous hollow-fiber membrane according to claim 1, wherein the coefficient of variation obtained by dividing the standard deviation of the short-side length of the columnar texture by the average value of the short-side length of the columnar texture is 0.15 or less.

9. The porous hollow-fiber membrane according to claim 1, wherein when the photograph of a cross-section parallel to the longitudinal direction of the porous hollow-fiber membrane is binarized into the structure portion and the void portion, the proportion of an area of the void portion is from 25 to 45%.

10. The porous hollow-fiber membrane according to claim 1, wherein the fluororesin-based polymer is a resin containing at least one selected from the group consisting of a vinylidene fluoride homopolymer and a vinylidene fluoride copolymer, and
    wherein the vinylidene fluoride copolymer includes a copolymer of vinylidene fluoride with one or more kinds of monomers selected from vinyl fluoride, tetrafluoroethylene, hexafluoropropylene and trifluorochloroethylene.

11. The porous hollow-fiber membrane according to claim 1, wherein the fluororesin-based polymer has a weight average molecular weight of from 150,000 to 600,000.

12. The porous hollow-fiber membrane according to claim 1, wherein the columnar texture accounts for 70% or more of the porous hollow-fiber membrane.

13. The porous hollow-fiber membrane according to claim 1, wherein the columnar texture has the short-side length of from 1.0 um to 2.5 um.

14. The porous hollow-fiber membrane according to claim 1, wherein the coefficient of variation obtained by dividing the standard deviation of the short-side length of the columnar texture by the average value of the short-side length of the columnar texture is 0.15 or less.

15. The porous hollow-fiber membrane according to claim 1 wherein when the photograph of a cross-section parallel to the longitudinal direction of the porous hollow-fiber membrane is binarized into the structure portion and the void portion, the proportion of an area of the void portion is from 25 to 45%.

16. The porous hollow-fiber membrane according to claim 1, wherein the fluororesin-based polymer is a resin containing at least one selected from the group consisting of a vinylidene fluoride homopolymer and a vinylidene fluoride copolymer, and wherein the vinylidene fluoride copolymer includes a copolymer of vinylidene fluoride with one or more kinds of monomers selected from vinyl fluoride, tetrafluoroethylene, hexafluoropropylene and trifluorochloroethylene.

17. The porous hollow-fiber membrane according to claim 1, wherein the fluororesin-based polymer has a weight average molecular weight of from 150,000 to 600,000.

18. The porous hollow-fiber membrane according to claim 1, having a pure-water permeation performance at 50 kPa and 25° C. of 0.7 $m^3/m^2/hr$ or more.

\* \* \* \* \*